US007218204B2

(12) United States Patent
Hayashi

(10) Patent No.: US 7,218,204 B2

(45) Date of Patent: May 15, 2007

(54) CONTACTLESS IC CARD

(75) Inventor: Joji Hayashi, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 228 days.

(21) Appl. No.: 10/915,391

(22) Filed: Aug. 11, 2004

(65) Prior Publication Data

US 2005/0040885 A1 Feb. 24, 2005

(30) Foreign Application Priority Data

Aug. 18, 2003 (JP) ............................ 2003-294694

(51) Int. Cl.
*H04Q 5/22* (2006.01)
*G05F 1/10* (2006.01)

(52) U.S. Cl. .................. 340/10.34; 340/10.1; 327/543

(58) Field of Classification Search ............ 340/10.34, 340/10.1, 572.1, 572.8; 327/538, 543; 235/492, 235/494

See application file for complete search history.

(56) References Cited

U.S. PATENT DOCUMENTS

| | | | | | |
|---|---|---|---|---|---|
| 5,440,302 | A * | 8/1995 | Irmer et al. | 340/10.34 |
| 6,070,804 | A | 6/2000 | Miyamoto | |
| 6,079,622 | A * | 6/2000 | Goto | 235/492 |
| 6,134,130 | A * | 10/2000 | Connell et al. | 363/89 |
| 6,515,919 | B1 * | 2/2003 | Lee | 365/192 |
| 6,630,858 | B1 * | 10/2003 | Takabayashi | 327/538 |
| 6,677,811 | B2 * | 1/2004 | Hayashi | 327/543 |
| 6,737,884 | B2 | 5/2004 | Shigemasa et al. | |
| 2001/0026186 | A1 * | 10/2001 | Watanabe et al. | 327/530 |

FOREIGN PATENT DOCUMENTS

| | | |
|---|---|---|
| EP | 1 282 071 | 2/2003 |
| JP | 7-271941 | 10/1995 |
| JP | 3376085 | 10/1995 |
| JP | 10-269327 | 10/1998 |
| JP | 2003-44176 | 2/2003 |

OTHER PUBLICATIONS

Shoichi Masui et al., "TA 9.1 A 13.56MHz CMOS RF Identification Transponder Integrated Circuit With A Dedicated CPU", IEEE International Solid-State Circuits Conference, 1999.

* cited by examiner

*Primary Examiner*—Edwin C. Holloway, III
(74) *Attorney, Agent, or Firm*—Wenderoth, Lind & Ponack, L.L.P.

(57) ABSTRACT

A contactless IC card includes a reference voltage circuit, a judging circuit for monitoring a reference voltage that is outputted from the reference voltage circuit, and a power supply stabilization, unit. The judging circuit judges whether the reference voltage is equal to or higher than a predetermined voltage. When the reference voltage does not reach the predetermined voltage, the power supply stabilization unit supplies energy to the power supply to suppress a steep increase in the power supply voltage, thereby stabilizing the power supply in the contactless IC card and suppressing deterioration of the signal quality.

11 Claims, 7 Drawing Sheets

CONTACTLESS IC CARD

FIELD OF THE INVENTION

The present invention relates to contactless IC cards to which a power supply voltage is supplied from outside in a noncontacting manner and, more particularly, to contactless IC cards in which a power supply voltage of an integrated circuit is stabilized.

BACKGROUND OF THE INVENTION

IC cards with CPUs featuring security functions, personal identification functions and the like are broadly divided into “IC cards with contacts” which communicate data with a reader/writer via contacts, and “contactless IC cards” which perform data transmission by electromagnetic induction or the like. Among these IC cards, contactless IC cards which transmit data via radio have greater durability because they do not need a connecting terminal to connect to an external device. Further, such contactless IC card rectifies received waves using a rectifier to generate a DC power supply that is required to activate the integrated circuit, eliminating the need of batteries, whereby it is effective in miniaturization of the system and reduction of the costs.

The conventional contactless IC card includes an analog circuit, a CPU, or a memory on one integrated circuit (for example, refer to “A 13.56 MHz CMOS RF Identification Transponder Integrated Circuit WithA Dedicated CPU” (Shoichi Masuiet al., ISSCC Digest of Technical Papers, pp. 162–163, FIG. 9.1.1 (Feb. 16, 1999)). There are also contactless IC cards to which a power supply voltage is supplied with stability even when a relative position between a reader/writer and the IC card varies (for example, refer to Japanese Patent No. 3376085, FIG. 3).

The operation of such contactless IC card will be described with reference to FIG. 9. A contactless IC card 1 comprises a coil antenna $L_1$ and a semiconductor integrated circuit 2. The semiconductor integrated circuit 2 comprises a rectifier 3, a shunt regulator 4, a demodulator 5, a modulator 6, a digital signal processing unit 7, a linear regulator 8, and a reference voltage circuit 9. As the rectifier 3, a full-wave rectification circuit that employs diodes $D_1$ to $D_4$ as shown in FIG. 10 is used.

A signal that is received by the coil antenna $L_1$ is rectified by the rectifier 3 to generate a power supply voltage VDDA. The demodulator 5 demodulates RX (receiving) data which is superimposed upon the power supply voltage VDDA. The RX data is transferred to the digital signal processing unit 7, which is constituted by a CPU or a memory. The modulator 6 modulates an impedance between ends of the coil antenna $L_1$ in accordance with TX (transmission) data that is generated by the digital signal processing unit 7. As the reference voltage circuit 9, a band-gap reference circuit as shown in FIG. 11 is used. This circuit generates a reference voltage Vref. In the case of band-gap reference circuit, this circuit generates, for example, the reference voltage Vref=1.2V.

As the linear regulator 8, a regulator circuit that employs an operational amplifier as shown in FIG. 8 is used. In the case of linear regulator as shown in FIG. 8, a power supply voltage VDDD having a value of $Vref \times (1+R_1/R_2)$ is generated as an output. For example, when it is assumed $R_1=R_2$, VDDD=2.4V. The power supply voltage VDDD is a power supply voltage for the digital signal processing unit 7.

The shunt regulator 4 is a circuit that prevents the power supply voltage VDDA from increasing above a breakdown voltage. It is assumed here that the communication standard is ISO14443 TYPE B. According to this standard, the carrier frequency is 13.56 MHz, the data rate is 106 kbps, the data transmission from the reader/writer to the contactless IC card is done by means of the 10% ASK modulation, and the data transmission from the contactless IC card to the reader/writer is done by means of the BPSK modulation.

The power that is supplied to the contactless IC card is decided based on the intensity of a magnetic field that is applied to the card coil. Usually, when the card becomes closer to the reader/writer (not shown), the intensity of the magnetic field is increased, whereby the power that is supplied to the semiconductor integrated circuit 2 is increased. The supplied power is converted into a DC voltage by the rectifier 3. Here, when the load to the semiconductor integrated circuit 2 is fixed, the power supply voltage is increased in proportion to the supplied power. The breakdown voltage of a transistor which is manufactured in the present semiconductor process is about 5V when the thickness of the gate oxide film is 10 nm. When the power supply voltage VDDA is increased above the breakdown voltage, the transistor would be broken.

The shunt regulator 4 that consumes an unnecessary power is employed to suppress an increase of the power supply voltage VDDA. For example, when the power supply voltage is increased above 4V, the shunt regulator 4 consumes excess energy and, as a result, the increase of the power supply voltage VDDA can be reduced. Further, the capability of the shunt regulator 4 is adjusted suitably to demodulate a modulated signal by the demodulator 5.

The conventional contactless IC card is constructed as described above and, since there is no need for a connecting terminal to connect to an external device, it has greater durability, and further, as the batteries are not required, this is effective in miniaturization of the system or reduction of the costs. However, this conventional IC card has the following problem. The linear regulator 8 cannot supply the power supply voltage VDDD earlier than start-up of the reference voltage circuit 9. This is because when the reference voltage Vref=0V, the voltage output from the above-mentioned linear regulator 8 becomes a power supply voltage VDDD=0. The start-up of the reference voltage circuit 9 takes time of above 100 μsec. For the above-mentioned reasons, when the energy that ought to be supplied to the power supply voltage VDDD is supplied to the power supply voltage VDDA, the potential of the power supply VDDA is increased, and when the power supply voltage voltage VDDA is increased above the breakdown voltage, the device would be broken. Such breakage of the device presents a more serious problem when the size of the digital signal processing unit 7 is larger, because the power supply voltage VDDA is increased more.

In order to suppress such increase of the power supply voltage VDDA, it is possible to increase the capacity of the shunt regulator 4, but when an ASK signal is to be demodulated, the demodulator 5 detects variations in the power supply voltage VDDA to demodulate RX data and, thus, when the capacity of the shunt regulator 4 is simply increased, the amount of variations in the signal is reduced, whereby the demodulation of the ASK signal by the demodulator 5 becomes difficult.

SUMMARY OF THE INVENTION

The present invention provides a high-performance contactless IC card that can suppress a steep increase of the power supply voltage VDDA by supplying energy to the power supply voltage VDDD even when the reference voltage circuit is not started at the input of a strong electric field, thereby avoiding a problem of breakage of the device.

Other objects and advantages of the invention will become apparent from the detailed description that follows. The detailed description and specific embodiments described are provided only for illustration since various additions and modifications within the spirit and scope of the invention will be apparent to those of skill in the art from the detailed description.

According to a 1st aspect of the present invention, there is provided a contactless IC card which comprises a coil antenna and a semiconductor integrated circuit, and receives electromagnetic wave energy that is transmitted from an external device using the coil antenna and rectifies the received energy using a rectifier, thereby generating a power supply voltage. The semiconductor integrated circuit includes: a rectifier for rectifying an output signal from the coil antenna to generate a first supply voltage; a reference voltage circuit for generating a reference voltage; a judging circuit for judging whether the reference voltage is equal to or higher than a predetermined voltage; and a power supply voltage stabilization unit for controlling a potential of the first supply voltage on the basis of a determination by the judging circuit. Therefore, it is possible to suppress a steep increase of the first power supply by supplying energy to the second power supply even when the reference voltage circuit has not started at the input of a strong electric field, thereby realizing a high-performance contactless IC card.

According to a 2nd aspect of the present invention, in the contactless IC card of the 1st aspect, the power supply voltage stabilization unit includes a linear regulator for generating a second power supply voltage from the first power supply voltage on the basis of the potential of the reference voltage, and the power supply voltage stabilization unit controls the linear regulator to operate in a case where the reference voltage is equal to or lower than the predetermined voltage on the basis of the determination of the judging circuit. Therefore, it is possible to suppress a steep increase of the first power supply voltage by supplying energy to the second power supply voltage even when the reference voltage circuit has not started at the input of a strong electric field, thereby realizing a high-performance contactless IC card.

According to a 3rd aspect of the present invention, in the contactless IC card of the 1st aspect, the power supply voltage stabilization unit has a linear regulator, and the linear regulator generates a second power supply voltage from the first power supply voltage on the basis of comparison between the reference voltage and the predetermined voltage by the judging circuit. Therefore, it is possible to suppress a steep increase of the first power supply voltage by supplying energy to the second power supply voltage even when the reference voltage circuit has not started at the input of a strong electric field, thereby realizing a high-performance contactless IC card.

According to a 4th aspect of the present invention, in the contactless IC card of the 1st aspect, the power supply voltage stabilization unit has a shunt circuit, and an operation of the shunt circuit is controlled in accordance with the determination of the judging circuit. Therefore, it is possible to consume excess energy using the shunt circuit to suppress a steep increase of the first power supply voltage even when the reference voltage circuit has not started at the input of a strong electric field, thereby realizing a high-performance contactless IC card.

According to a 5th aspect of the present invention, in the contactless IC card of the 1st aspect, the predetermined voltage that is used for comparison in the judging circuit does not depend on the first power supply voltage, and is a fixed voltage which is lower than the reference voltage. Therefore, it is possible to suppress a steep increase of the first power supply voltage by supplying energy to the second power supply voltage even when the reference voltage circuit has not started at the input of a strong electric field, thereby realizing a high-performance contactless IC card.

According to a 6th aspect of the present invention, in the contactless IC card of the 1st aspect, the reference voltage circuit is a band-gap reference circuit. Therefore, it is possible to suppress a steep increase of the first power supply voltage by supplying energy to the second power supply voltage even when the reference voltage circuit has not started at the input of a strong electric field, thereby realizing a high-performance contactless IC card.

According to a 7th aspect of the present invention, in the contactless IC card of the 4th aspect, the shunt circuit comprises a resistor and a switch, the resistor and switch are connected in series between the first power supply voltage and a ground, and the switch is controlled in accordance with an output of the judging circuit. Therefore, it is possible to consume excess energy using the shunt circuit to suppress a steep increase of the first power supply voltage even when the reference voltage circuit has not started at the input of a strong electric field, thereby realizing a high-performance contactless IC card.

According to an 8th aspect of the present invention, in the contactless IC card of the 7th aspect, the judging circuit forcefully closes the switch in the shunt circuit when the reference voltage is lower than the predetermined voltage. Therefore, it is possible to consume excess energy using the shunt circuit to suppress a steep increase of the first power supply voltage even when the reference voltage circuit has not started at the input of a strong electric field, thereby realizing a high-performance contactless IC card.

According to a 9th aspect of the present invention, in the contactless IC card of the 3rd aspect, the judging circuit selects a higher voltage between the reference voltage and the predetermined voltage to be employed as the reference voltage. Therefore, it is possible to consume excess energy using the shunt circuit to suppress a steep increase of the first power supply voltage even when the reference voltage circuit has not started at the input of a strong electric field, thereby realizing a high-performance IC contactless IC card.

According to a 10th aspect of the present invention, in the contactless IC card of the 1st aspect, the predetermined voltage is a voltage across a forward-biased diode. Therefore, it is possible to consume excess energy using the shunt circuit to suppress a steep increase of the first power supply voltage even when the reference voltage circuit has not started at the input of a strong electric field, thereby realizing a high-performance contactless IC card.

According to an 11th aspect of the present invention, in the contactless IC card of the 1st aspect, the semiconductor integrated circuit includes a shunt regulator that is connected in series between the first power supply voltage and the ground. Therefore, it is possible to consume excess energy using the shunt circuit to suppress a steep increase of the first power supply voltage even when the reference voltage circuit has not started at the input in the first power supply voltage, thereby realizing a high-performance contactless IC card.

According to a 12th aspect of the present invention, in the contactless IC card of the 1st aspect, the semiconductor integrated circuit includes: a demodulator for demodulating RX (receiving) data which is superimposed upon the first power supply voltage; and a digital signal processing unit for processing the RX (receiving) data. Therefore, it is possible to consume excess energy using the shunt circuit to suppress a steep increase of the first power supply voltage even when the reference voltage circuit has not started at the input of a strong electric field, thereby realizing a high-performance contactless IC card.

According to a 13th aspect of the present invention, the contactless IC card of the 12th aspect further includes: a modulator for modulating an impedance between ends of the antenna coil in accordance with TX (transmission) data that is transmitted from the digital signal processing unit. Therefore, it is possible to consume excess energy using the shunt circuit to suppress a steep increase of the first power supply voltage even when the reference voltage circuit has not started at the input of a strong electric field, thereby realizing a high-performance contactless IC card.

According to a 14th aspect of the present invention, in the contactless IC card of the 1st aspect, the rectifier is a full-wave rectification circuit. Therefore, it is possible to consume excess energy using the shunt circuit to suppress a steep increase of the first power supply voltage even when the reference voltage circuit has not started at the input of a strong electric field, thereby realizing a high-performance contactless IC card.

According to a 15th aspect of the present invention, in the contactless IC card of the 12th aspect, the demodulator demodulates an ASK modulated signal. Therefore, it is possible to consume excess energy using the shunt circuit to suppress a steep increase of the first power supply voltage even when the reference voltage circuit has not started at the input of a strong electric field, thereby realizing a high-performance contactless IC card.

DETAILED DESCRIPTION OF THE PREFERRED EMBODIMENTS

Figure 1:
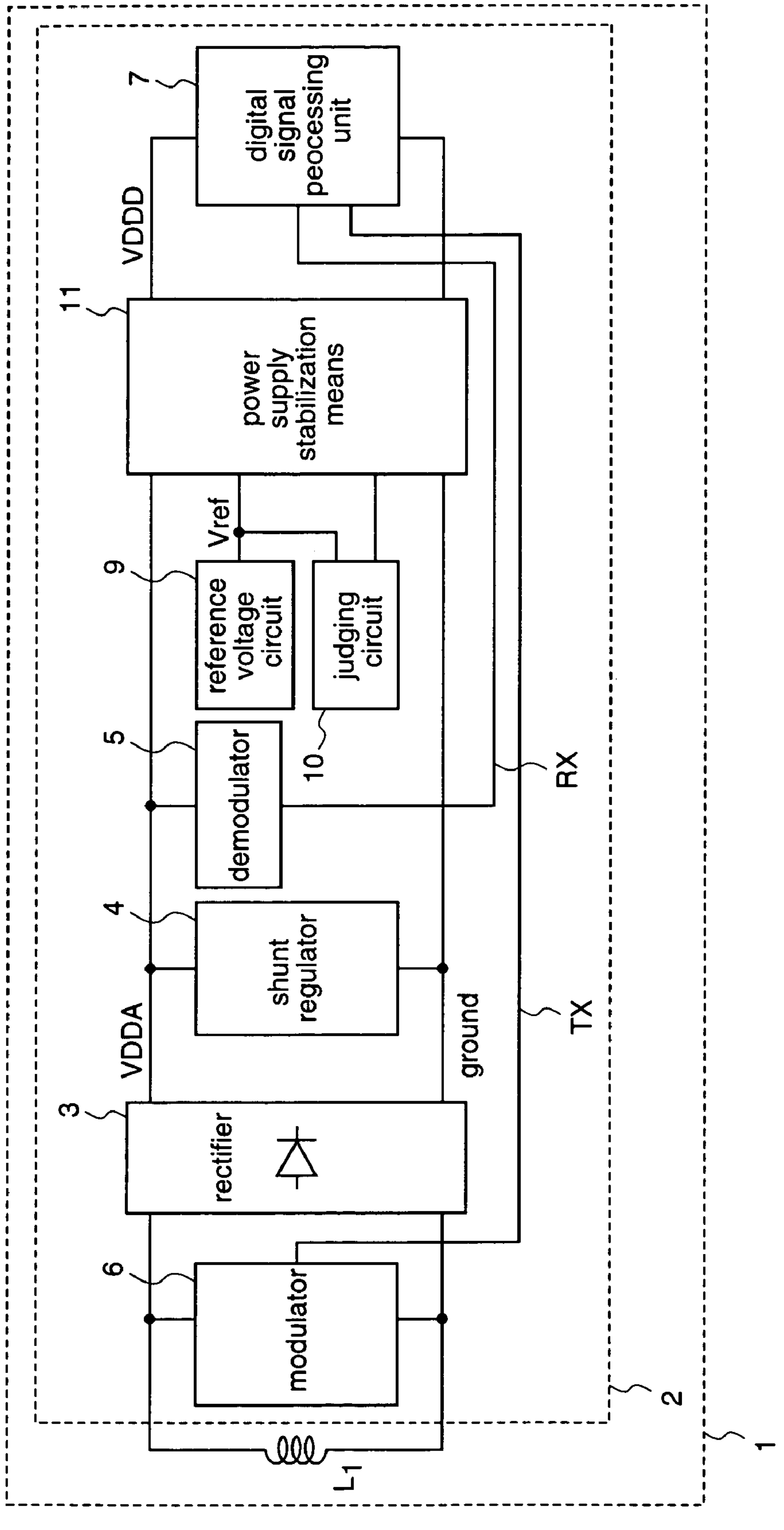
FIG. 1 is a diagram illustrating a structure of a contactless IC card according to a first embodiment of the present invention.

Hereinafter, embodiments of the present invention will be described. The same or corresponding components in the following drawings are denoted by the same reference numerals.

Embodiment 1

A contactless IC card according to a first embodiment of the present invention will be described with reference to FIG. 1.

Figure 3:
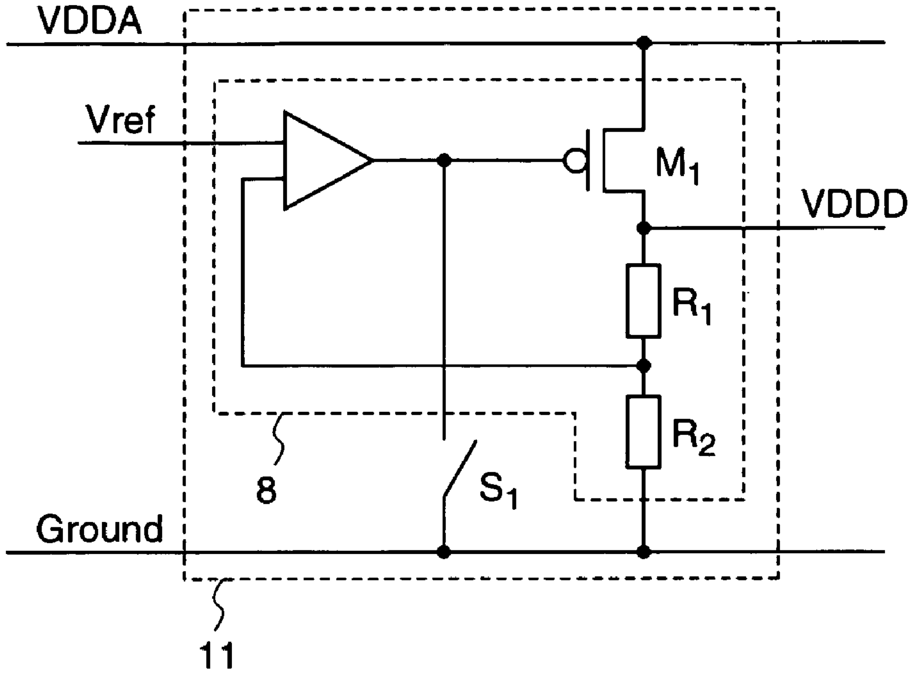
FIG. 3 is a diagram illustrating an example of a power supply stabilization means, which is used for the contactless IC card according to the first embodiment.
Figure 4:
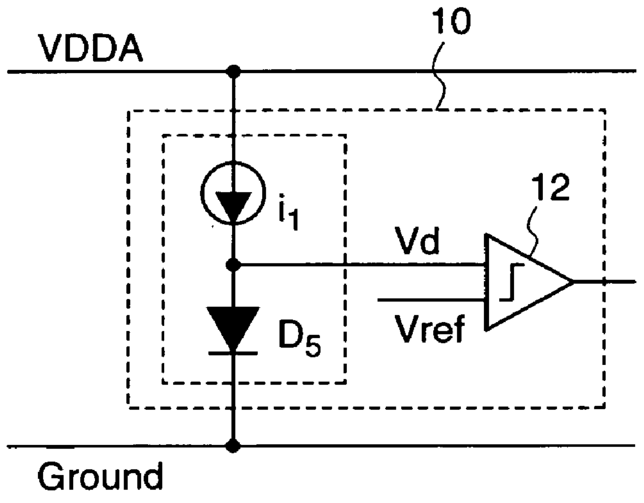
FIG. 4 is a diagram illustrating an example of a judging circuit, which is used for the contactless IC card according to the first embodiment.

This contactless IC card is different from the prior art in including a judging circuit 10 and a power supply voltage stabilization means (hereinafter, referred to as a power supply stabilization means) 11. The power supply stabilization means 11 is constituted by a linear regulator 8 and a switch $S_1$, as shown in FIG. 3. The switch $S_1$ is connected to the gate of a current control transistor$M_1$ of the linear regulator 8. The judging circuit 10 is constituted by a diode $D_5$, a current source $i_1$, and a comparator 12, as shown in FIG. 4. The diode $D_5$ and the current source $i_1$ are connected in series between the power supply voltage VDDA and the ground.

Next, the operation of the contactless IC card will be described. The basic operation is the same as that of the prior art. A signal that is received by the coil antenna $L_1$ is rectified by the rectifier 3 to generate a power supply voltage VDDA. The demodulator 5 demodulates RX (receiving) data which is superimposed upon the power supply voltage VDDA. The RX data is transferred to the digital signal processing unit 7 that is constituted by a CPU or a memory. The modulator 6 modulates an impedance between ends of the coil antenna $L_1$ in accordance with TX (transmission) data that is generated by the digital signal processing unit 7. It is assumed here that a voltage Vd across the forward-biased diode $D_5$ has a predetermined value. For example, the positive voltage Vd is 0.8V. The comparator 12 included in the judging circuit 10 compares the predetermined voltage Vd and a reference voltage Vref with each other. When the reference voltage Vref is lower than the predetermined voltage Vd, which means that the reference voltage Vref has not sufficiently risen, the switch $S_1$ is forcefully turned ON, thereby supplying power from the power supply voltage VDDA to the power supply voltage VDDD. Conversely, when the reference voltage Vref is higher than the predetermined voltage Vd, the switch $S_1$ is turned OFF because it means that the reference voltage Vref has sufficiently risen, thereby normally operating the linear regulator 8 that is included in the judging circuit 10.

In this way, even when a strong electric field is applied during a period until the reference voltage circuit 9 starts up, the power is continuously supplied to the power supply voltage VDDD, thereby preventing the power supply voltage VDDA from increasing above the breakdown voltage.

As described above, according to the contactless IC card of the first embodiment, the judging circuit 10 for monitoring the reference voltage Vref that is output from the reference voltage circuit 9 is provided, and then the power supply voltage VDDA is supplied to the power supply voltage VDDD by the power supply stabilization means 11 during a period until the reference voltage Vref of the reference voltage circuit 9 rises. Therefore, it is possible to suppress an increase of the power supply voltage VDDA even in a period while the reference voltage Vref has not risen yet, thereby preventing the device from being broken.

Embodiment 2

A contactless IC card according to a second embodiment of the present invention will be described.

Figure 5:
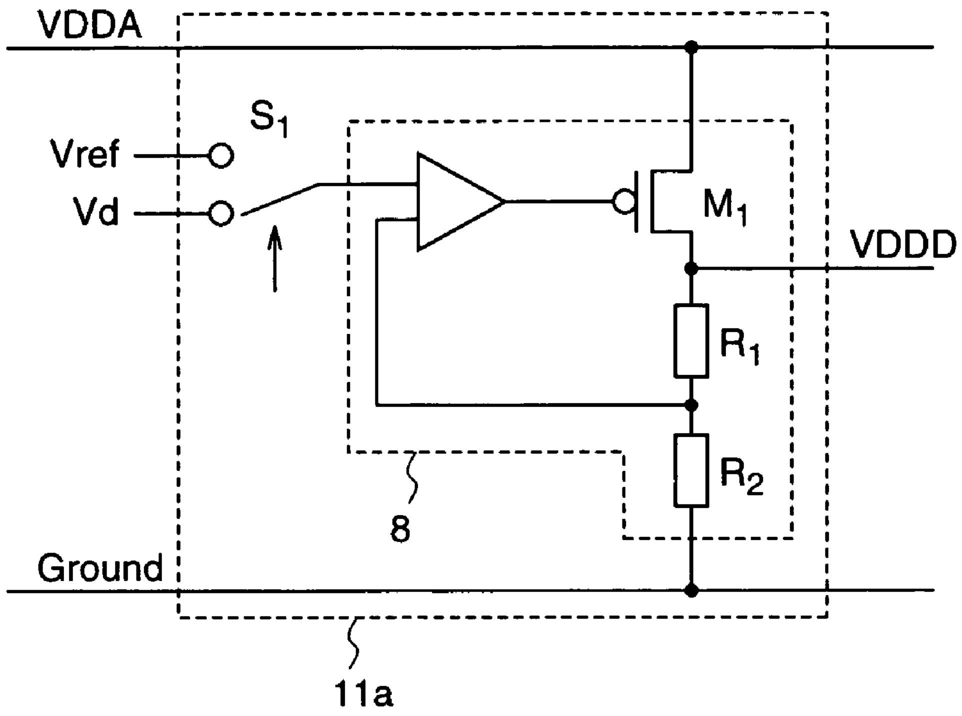
FIG. 5 is a diagram illustrating an example of a power supply stabilization means, which is used for the contactless IC card according to the second embodiment.

The basic structure of the contactless IC card of the second embodiment is the same as that of the first embodiment. The difference from the first embodiment is that the power supply stabilization means 11 is replaced with a power supply stabilization means 11*a* using a linear regulator 8 as shown in FIG. 5, and the judging circuit 10 controls a reference voltage Va of the linear regulator 8.

The judging circuit 10 selects a higher voltage between the reference voltage Vref and the diode voltage Vd as the reference voltage Va.

With the above-mentioned structure, the power according to the reference voltage Vref or the diode voltage Vd is continuously supplied to the power supply voltage VDDD even when a strong electric field is applied during a period until the reference voltage circuit 9 starts, thereby preventing the power supply voltage VDDA from increasing above the breakdown voltage.

Embodiment 3

Figure 2:
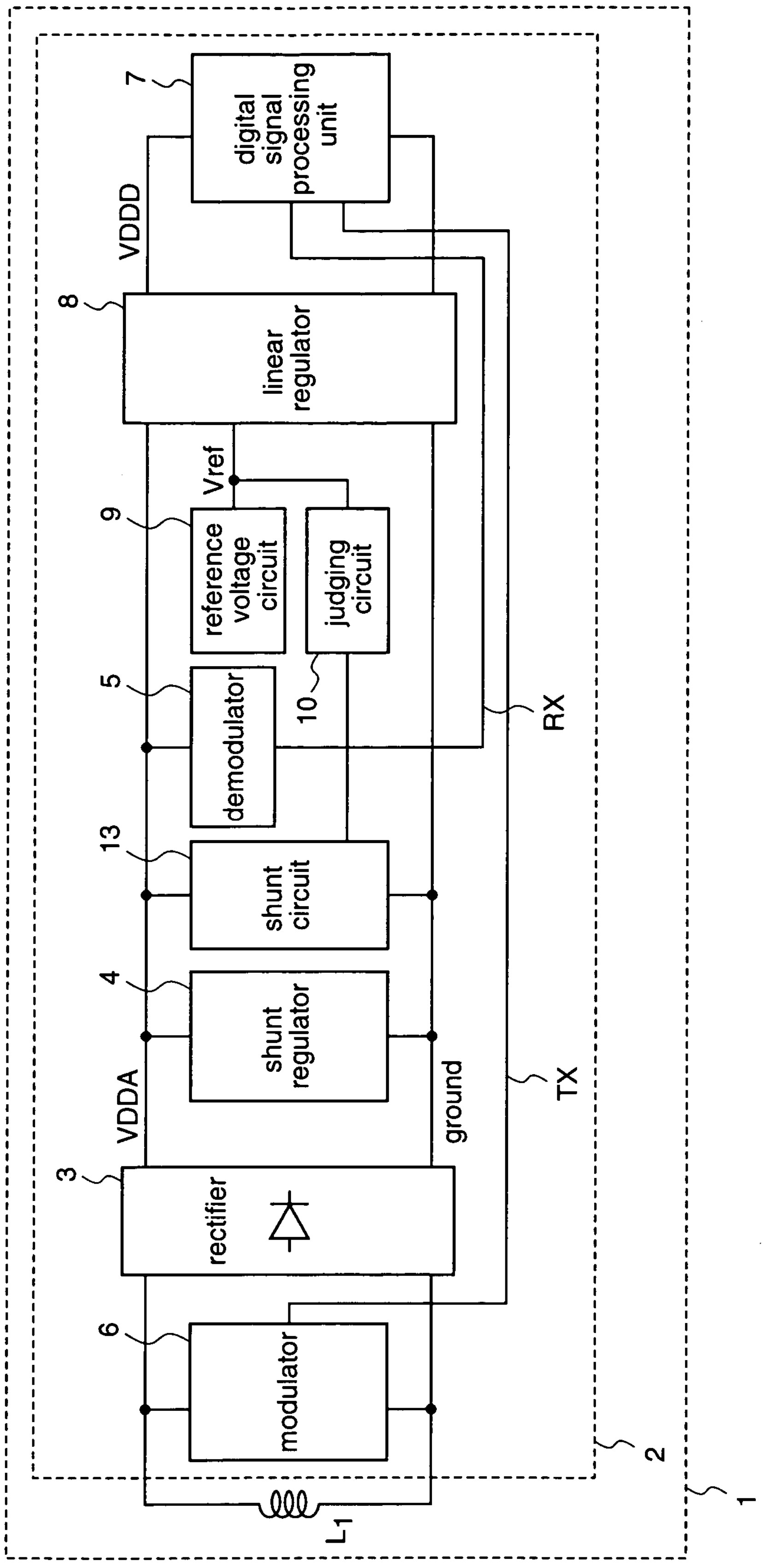
FIG. 2 is a diagram illustrating a structure of a contactless IC card according to a third embodiment of the present invention.

A contactless IC card according to a third embodiment of the present invention will be described with reference to FIG. 2.

This contactless IC card is different from the first embodiment in that the power supply stabilization means 11 is replaced with a linear regulator 8, and further a shunt circuit 13 that is connected between the power supply voltage VDDA and the ground is provided between the shunt regulator 4 and the demodulator 5.

Hereinafter, the operation of the contactless IC card will be described.

Figure 6:
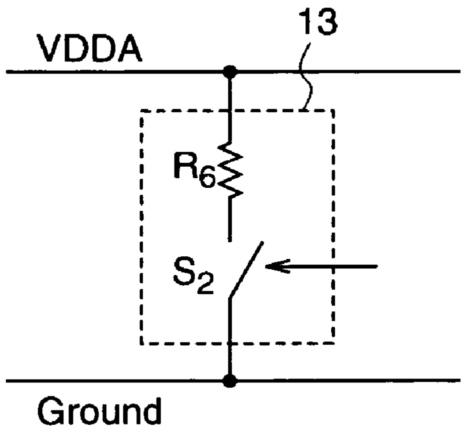
FIG. 6 is a diagram illustrating an example of a shunt circuit, which is used for the contactless IC card according to the third embodiment.

The shunt circuit 13 is constituted by a resistor $R_6$ and a switch $S_2$ which are connected in series between the power supply voltage VDDA and the ground, as shown in FIG. 6. The judging circuit 10 turns the switch $S_2$ of the shunt circuit 13 ON to suppress an increase of the power supply voltage VDDA until the reference voltage circuit 9 starts up. When the reference voltage circuit 9 starts up, the judging circuit 10 turns the switch $S_2$ of the shunt circuit 13 OFF, thereby suppressing power consumption in the shunt circuit 13.

With the above-mentioned structure, the excess energy is consumed by the shunt circuit 13 until the reference voltage circuit 9 starts up, thereby suppressing a steep increase of the power supply voltage VDDA at the input of a strong electric field.

The structures of the rectifier 3, the linear regulator 8, the reference voltage circuit 9, the judging circuit 10 and the power supply stabilization means 11, the predetermined voltage, and the communication standard, which are used in the first to third embodiments are only exemplary, and the present invention is not limited to these examples. For example, the full-wave rectification circuit has been employed as the rectifier 3, while it is possible to employ a half-wave rectification circuit. As the rectifier 3, any circuit can be used so long as it converts an AC signal into a DC signal. Further, the positive voltage Vd of the diode $D_5$ has been employed as the predetermined voltage, while it is possible to employ a voltage that is obtained by a diode connection of a bipolar or MOS transistor to a device. Further, as the predetermined voltage, any voltage may be used so long as it can rise before the reference voltage circuit 9 (a reference voltage source) will start up, and has a voltage value that is equal to or higher than the ground and equal to or lower than the reference voltage Vref at the normal operation. Further, the linear regulator 8 that is used in this third embodiment is not essential, and can be eliminated in the case of a system that can share the power supply voltage VDDD and the power supply voltage VDDA.

In the case of a system that does not require receiving and transmission, one of the demodulator 5 and the modulator 6, or both of them can be eliminated.

When the supplied power is small, the shunt regulator 4 can be eliminated.

Figure 7:
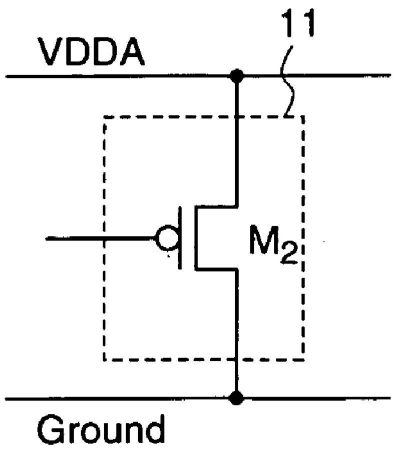
FIG. 7 is a diagram illustrating an example of a power supply stabilization means, which is used for the contactless IC card according to the third embodiment.
Figure 8:
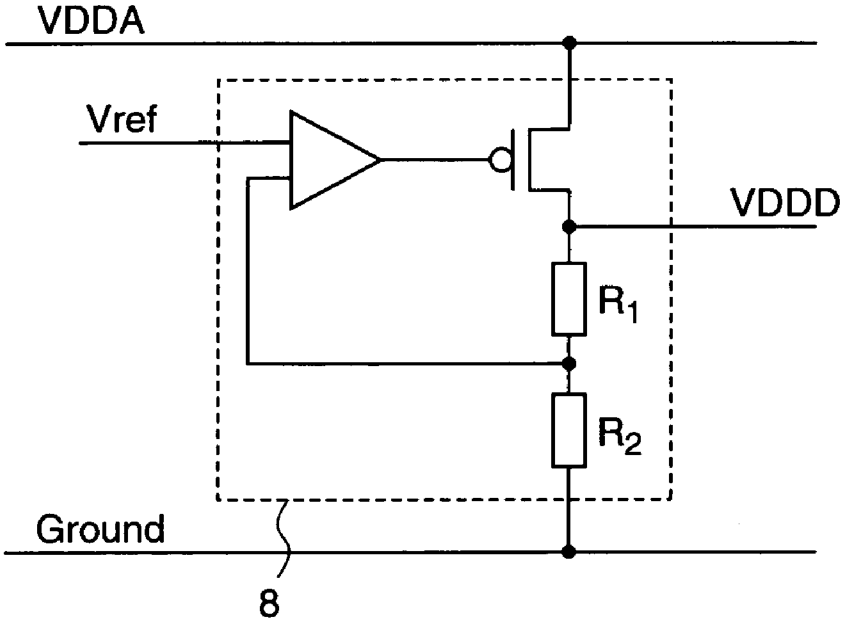
FIG. 8 is a diagram illustrating an example of a linear regulator.
Figure 9:
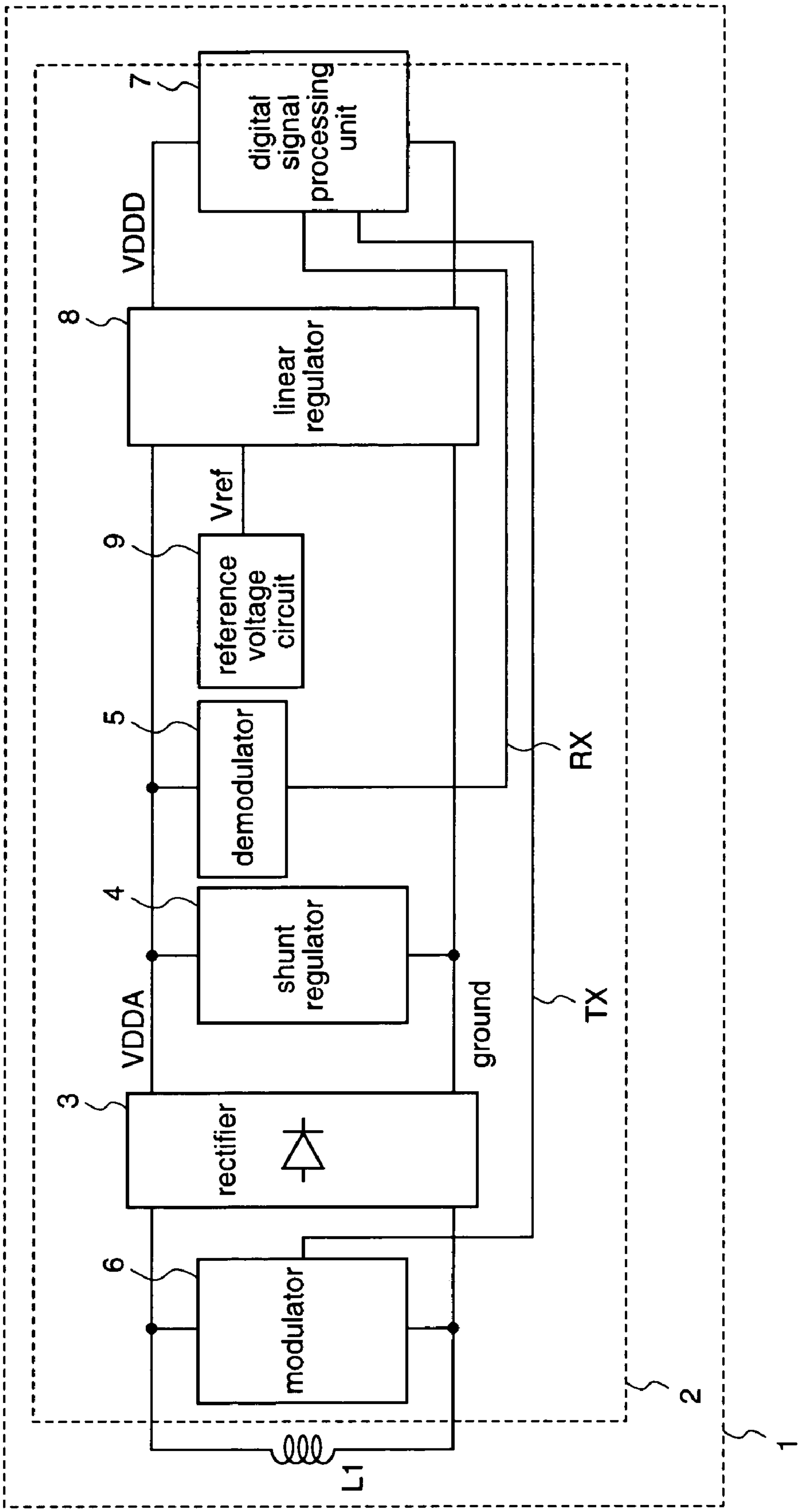
Fig.9 Prior Art
FIG. 9 is a diagram illustrating a structure of a prior art contactless IC card.
Figure 10:
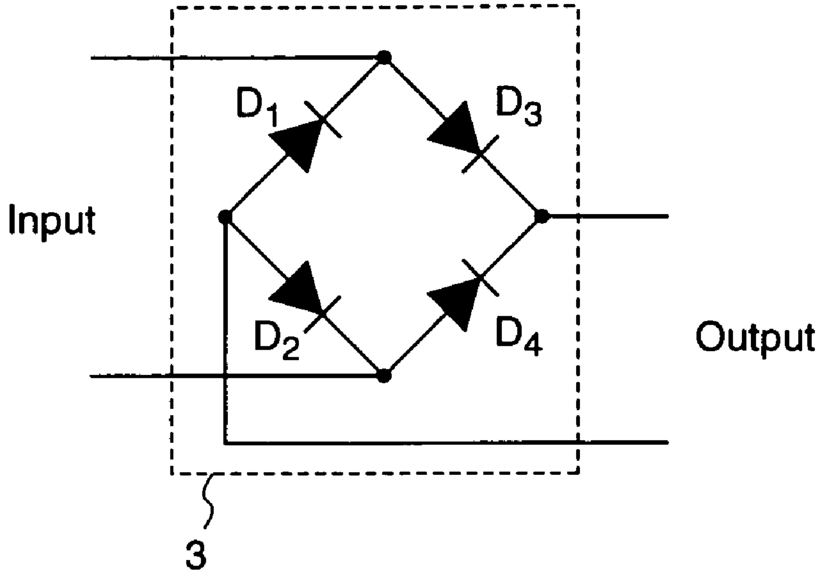
FIG. 10 is a diagram illustrating an example of a rectifier.
Figure 11:
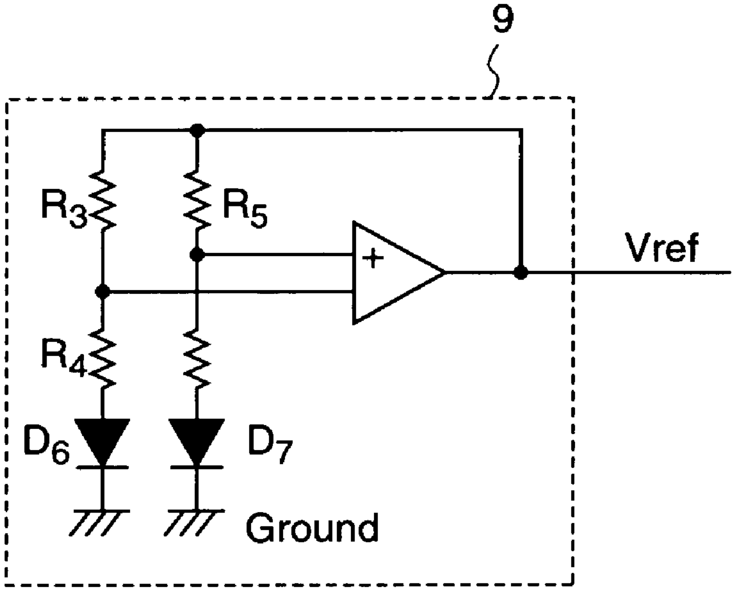
FIG. 11 is a diagram illustrating an example of a reference voltage circuit.

Further, in the third embodiment, the shunt circuit 13 is used as the power supply stabilization means 11, while it is possible to provide a structure in which the drain and the source of a transistor $M_2$ are connected to the power supply voltage VDDA and the ground, respectively, as shown in FIG. 7, thereby controlling the gate by the judging circuit 10.

It is also possible that two rectifiers are employed as the power supply stabilization means 11, and one or both of the two rectifiers are selected by the judging circuit 10. In brief, the present invention encompasses all contactless IC cards which have a power supply stabilization means 11 that controls the voltage of the power supply voltage VDDA using the judging circuit 10 until the reference voltage circuit 9 starts up.

The contactless IC card according to the present invention supplies energy to the power supply voltage VDDD of the digital signal processing unit even when the reference voltage circuit is not starting at the input of a strong electric field, thereby suppressing a steep increase of the power supply voltage VDDA which is obtained by converting the energy using the coil antenna. Therefore, the power supply voltage can be stabilized, and thus a high-performance contactless IC card is realized.

What is claimed is:

1. A contactless IC card comprising:

a coil antenna for receiving electromagnetic wave energy that is transmitted from an external device; and a semiconductor integrated circuit including:

a rectifier for rectifying an output signal from said coil antenna to generate a first supply voltage having an RX (received) signal superimposed thereon;

a demodulator for extracting the RX signal from the first supply voltage;

a digital signal processing unit for signal processing the extracted RX signal;

a reference voltage circuit for generating a reference voltage;

a judging circuit for judging whether the reference voltage is equal to or higher than a predetermined voltage which has an earlier rising time than the reference voltage; and a power supply voltage stabilization unit for generating a second supply voltage from the first supply voltage on the basis of a result of the judgment by said judging circuit, wherein said power supply voltage stabilization unit is operable to supply the first supply voltage to the second supply voltage when said judging circuit judges that the reference voltage is lower than the predetermined voltage.

2. The contactless IC card as defined in claim 1, wherein said power supply voltage stabilization unit includes a linear regulator for generating the second power supply voltage from the first power supply voltage on the basis of the potential of the reference voltage, and said power supply voltage stabilization unit is operable to activate said linear regulator to operate when said judging circuit judges that the reference voltage is higher than the predetermined voltage, and supply the first supply voltage to the second supply voltage when said judging circuit judges that the reference voltage is lower than the predetermined voltage.

3. The contactless IC card as defined in claim 1, wherein said power supply voltage stabilization unit includes a linear regulator, and said linear regulator is operable to generate the second power supply voltage from the first power supply voltage in proportion to the predetermined voltage when said judging unit judges that the reference voltage is lower than the predetermined voltage, and generate the second supply voltage from the first supply voltage in proportion to the reference voltage when said judging circuit judges that the reference voltage is higher than the predetermined voltage.

4. The contactless IC card as defined in claim 1, wherein said power supply voltage stabilization unit includes a shunt circuit, and said shunt circuit is operable to pass a current from the first power supply voltage to ground when the reference voltage is lower than the predetermined voltage.

5. The contactless IC card as defined in claim 1, wherein the predetermined voltage in a steady state does not depend on the first power supply voltage and is a fixed voltage.

6. The contactless IC card as defined in claim 1, wherein said reference voltage circuit is a band-gap reference circuit.

7. The contactless IC card as defined in claim 4, wherein said shunt circuit comprises a resistor and a switch, said resistor and said switch are connected in series between the first power supply voltage and a ground, and said switch is forcibly turned on when the reference voltage is lower than the predetermined voltage.

8. The contactless IC card as defined in claim 1, wherein said judging circuit includes a diode and a current source connected between the first power supply voltage and ground, and the predetermined voltage is a voltage of said diode in a forward-biased condition.

9. The contactless IC card as defined in claim 1, wherein said semiconductor integrated circuit further includes a modulator for modulating an impedance between ends of said antenna coil in accordance with TX (transmission) data that is transmitted from said digital signal processing unit.

10. The contactless IC card as defined in claim 1, wherein said rectifier is a full-wave rectification circuit.

11. The contactless IC card as defined in claim 1, wherein said demodulator is operable to demodulate an ASK modulated signal.

* * * * *